United States Patent
Dragone

(10) Patent No.: US 6,463,197 B1
(45) Date of Patent: Oct. 8, 2002

(54) COUPLING OF OPTICAL SIGNALS TO MISALIGNED WAVEGUIDES ON DIFFERENT WAFERS

(75) Inventor: Corrado P. Dragone, Little Silver, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 2 days.

(21) Appl. No.: 09/703,551

(22) Filed: Nov. 1, 2000

(51) Int. Cl.[7] .............................. G02B 6/24; G02B 6/26
(52) U.S. Cl. ............................. 385/50; 385/15; 385/16; 385/20
(58) Field of Search .............................. 385/15, 17, 39, 385/50, 52, 20, 21, 16

(56) References Cited

U.S. PATENT DOCUMENTS

| | | | |
|---|---|---|---|
| 5,062,681 A | * 11/1991 | Furmanak et al. | 385/39 |
| 5,136,671 A | 8/1992 | Dragone | 385/46 |
| 5,212,758 A | 5/1993 | Adar et al. | 385/129 |
| 6,304,690 B1 | * 10/2001 | Day | 385/134 |

OTHER PUBLICATIONS

Goh, T., Himeno, A., Okuno, M., Takahashi, H., and Hattori, K., "High–Extinction Ratio and Low Loss Silica–Based 8×8 Thermooptic Matrix Switch," IEEE Photon. Technol. Lett., vol. 10, No. 3, pp. 358–360, Mar. 1998.

Granestrand, P., Lagerstrom, B., Svensson, P., Olofsson, H., Falk, J. E., and Stoltz, B., "Pigtailed Tree–structured 8×8 LiNbO$_3$ Switch Matrix with 112 Digital Optical Switches," IEEE Photon. Technol. Lett., vol. 6, No. 1, pp. 71–73, Jan. 1994.

Dragone, C., "An N x N Optical Multiplexer Using a Planar Arrangement of Two Star Couplers" IEEE Photon. Technol. Lett., vol. 3, No. 9, pp. 812–815, Sep. 1991.

Dragone, C., "Optimum design of a planar array of tapered waveguides" J. Opt. Soc. Am. A, vol. 7, No. 11, pp. 2081–2093, Nov. 1990.

* cited by examiner

Primary Examiner—Brian Sircus
Assistant Examiner—Michael C. Zarroli
(74) Attorney, Agent, or Firm—John A. Caccuro

(57) ABSTRACT

An imaging arrangement technique is used to align a first waveguide on a first wafer to a second waveguide on a second wafer. The adaptive imaging arrangement is used on both the first and second waveguides when the first and second wafers are orthogonal to each other. In one embodiment, my imaging arrangement is used in an N×N optical cross-connect constructed using orthogonal abutting input and output planar arrays of N switches. If N is not too large, the optimum construction involves only two stages of trees, each incorporating an adaptive imaging arrangement allowing the input and output trees to be directly joined together without need for precise alignment.

21 Claims, 8 Drawing Sheets

COUPLING OF OPTICAL SIGNALS TO MISALIGNED WAVEGUIDES ON DIFFERENT WAFERS

CROSS-REFERENCE TO RELATED APPLICATIONS

Related subject matter is disclosed in my previously filed application entitled "LARGE N×N OPTICAL SWITCH USING BINARY TREES," Ser. No. 09/687,346, filed on Oct. 13, 2000 and assigned to the same assignee.

TECHNICAL FIELD OF THE INVENTION

The present invention relates to the interconnection of optical waveguides and, more particularly, to a technique for the coupling of optical signals to misaligned waveguides located on different wafers.

BACKGROUND OF THE INVENTION

In high capacity optical networks, an essential device is the N×N crossconnect switch. The function of this switch is to provide at each node full connectivity among several incoming fibers, each carrying several wavelength channels [1–6]. (Note in this specification, a reference to another document is designated by a number in brackets to identify its location in a list of references found in the Appendix) In my above identified related patent application, I described a technique for implementing an N×N crossbar switch by including orthogonal sets of planar switches directly joined together without fiber connections. This technique can be used for the design of a N×N switch using the classical crossbar arrangement shown in FIG. 1. The basic purpose of the N×N crossbar switch arrangement is to form a total of $N^2$ paths without waveguide crossings. In operation, a switch connection between N inputs and N outputs is realized by the arrangement by activating N particular paths, while blocking the remaining paths. The $N^2$ paths are produced by two sets of planar switches, arranged in input and output block arrays that are directly jointed together, with a rotation of ninety degrees between the two blocks as shown in FIG. 1. Each of the N input switches is connected to all N output switches, and each of the N output switches is connected to all N input switches. The input and output planar arrays of N switches are all identical, and they can be realized without waveguide crossings in integrated form.

A difficulty, with the above arrangement, is that it requires over the junction plane precise alignment between the input and output input an output arrays.

SUMMARY OF THE INVENTION

In accordance with the present invention, I have solved the above-described difficulty by using adaptive imaging to minimize alignment errors in the active paths. The arrangement can also reduce crosstalk, since it can be designed to perform as a switching arrangement substantially reducing transmission in the crosstalk paths.

In one embodiment, an N×N optical cross-connect is constructed using orthogonal abutting of arrays of planar switches. If N is not too large, the optimum construction involves only two stages of planar switches, each incorporating an adaptive imaging arrangement allowing the input and output switches to be directly joined together without need for precise alignment.

My adaptive imaging arrangement technique may, more generally, be used to align a first waveguide on a first wafer to a second waveguide on a second wafer. In general, misalignments occur both in the plane of the first wafer and in the orthogonal direction. Therefore efficient correction requires in general that the two wafers be approximately orthogonal to each other, and two adaptive imaging arrangement are required, one in each wafer. Thus, my adaptive imaging arrangement technique may be used to maximize coupling between waveguides located on different wafers or, more generally, between two arrays of waveguides located on two arrays of abutting wafers. The arrangement can also be designed to perform as a switching device, capable of maximizing transmission when it is traversed by an intended signal, and also capable of minimizing transmission when it is only traversed by a crosstalk path.

In accordance with my invention, I disclosed an apparatus for interconnection of two or more optical waveguides comprising a first planar wafer having a first optical imaging device for selectively focusing a signal on a first optical waveguide to a first focal point located along a predefined first focal interval of an edge of the first wafer; a second waveguide located on a second planar wafer that has an abutting edge forming an intersection junction with the edge of the first wafer, the second wafer includes an optical imaging device for selectively coupling a signal on a second optical waveguide to a focal point located along a predefined focal interval of the abutting edge of the second wafer, the focal intervals of the first and second wafers intersect each other; and wherein the first and second optical imaging devices each operate in response to a control signal to align their respective focal points with the intersection junction and thereby maximize signal coupling from the first optical waveguide to the second optical waveguide.

According to another aspect of my invention, the optical waveguide interconnection apparatus may be arranged as an N×N optical cross-connect apparatus comprising a first plurality of first planar wafers, each first wafer including an input optical waveguide connected to a 1×N switch, each of the N output waveguides of the switch having an optical imaging device for selectively coupling a signal to a focal point located along a predefined interval of the abutting edge of the first wafer, thus forming a first array of disjoint intervals, each corresponding to a particular output waveguide of a particular first wafer;

a second plurality of second planar wafers, each second wafer including an N×1 switch connected to an output optical waveguide, each of the N input waveguides of the switch having an optical imaging device for selectively coupling the optical waveguide to an input focal point located along a predefined interval of the abutting edge of said second wafer; thus forming a second array of disjoint intervals, each corresponding to a particular input waveguide of a particular second wafer;

wherein the plurality of first and second wafers are essentially abutted orthogonal to each other to form a grid of intersection junctions therebetween and wherein each interval of the first array intersect a corresponding interval of the second array; and wherein each pair of optical imaging devices producing a pair of intersecting intervals are responsive to a control signal to align their respective focal points to enable the coupling of an optical signal from a first optical imaging device to a second optical device of said pair.

According to another aspect of my invention, I disclose a method of operating an apparatus for interconnecting optical waveguides comprising the steps of abutting an first edge of a first planar wafer to a second edge of a second planar wafer, the first wafer having a first optical imaging device for selectively coupling a signal to a first focal point located along a first predefined interval of the first abutting edge of the first wafer and the second planar wafer having a second optical imaging device for selectively coupling a signal to a second focal point located along a second predefined interval of the second abutting edge of the second wafer so as to overlap said first predefined interval of the first abutting edge of the first wafer; and selectively operating at least one of the first and second optical imaging devices to enable the first focal point to align with the second focal point to enable the coupling of an optical signal between the first optical imaging device and the second optical imaging device.

BRIEF DESCRIPTION OF THE DRAWINGS

In the drawings.

In the following description, identical element designations in different figures represent identical elements. Additionally in the element designations, the first digit refers to the figure in which that element is first located (e.g., 102 is first located in FIG. 1).

DETAILED DESCRIPTION

In accordance with the present invention, I describe the construction of an N×N optical cross-connect by using 1×N and N×1 planar switches formed, illustratively, using binary trees of 1×2 and 2×1 elements. If N is not too large, the optimum construction involves only two stages of trees, each incorporating an adaptive imaging arrangement allowing the input and output trees to be directly joined together without need for precise alignment. A similar construction is used for larger N, by including a larger number of stages. In all cases the arrangement features minimum loss and crosstalk. Note while the 1×N and N×1 planar switches are described, illustratively, as using binary trees of 1×2 and 2×1 elements, other known types of 1×N and N×1 planar switches may also be utilized.

Figure 1:
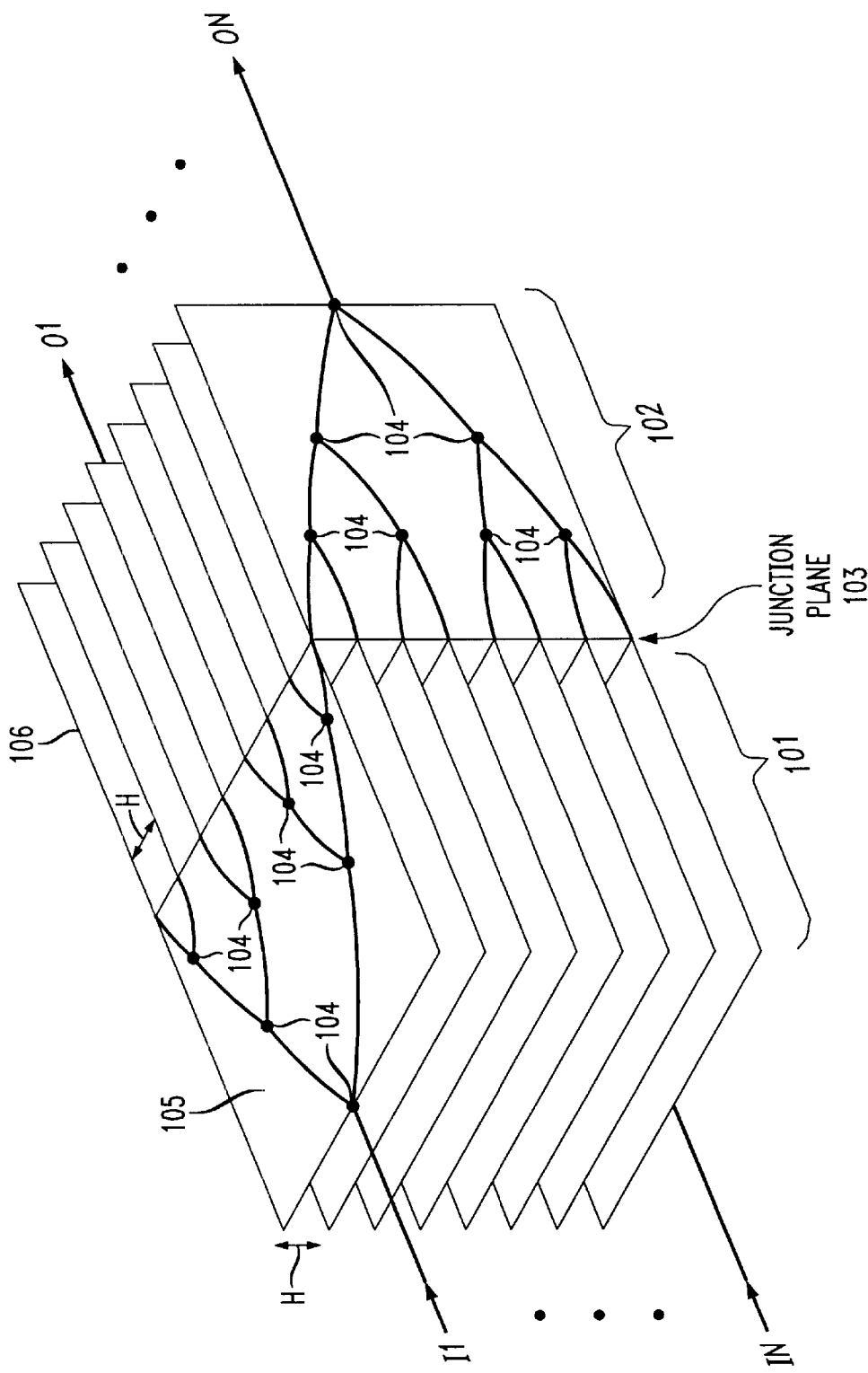
FIG. 1 shows a block diagram of an N×N crossbar switch implemented using two orthogonal sets of planar switches.

With reference to FIG. 1, this technique is described for use in the design of a N×N switch using the classical crossbar arrangement. The basic purpose of the N×N crossbar switch arrangement is to form a total of $N^2$ paths without waveguide crossings. In operation, a switch connection between N inputs, I1–IN, and N outputs, O1–ON, is realized by the arrangement by activating N particular switch paths, while blocking the remaining switch paths. The $N^2$ paths are produced by two sets of planar switches, arranged in input 101 and output 102 block arrays that are directly jointed together at a junction plane 103, with a rotation of ninety degrees between the two blocks as shown in FIG. 1. At junction plane 103, each of the N input switches is connected to all N output switches, and each of the N output switches is connected to all N input switches. The input and output planar arrays of N switches are all identical, and they can be realized without waveguide crossings in integrated form. The input 1×N and output N×1 planar switches (or wafers) 105 and 106 are formed, respectively, using binary trees of 1×2 and 2×1 elements without waveguide crossings. Each of the 1×2 and 2×1 elements 104 is separately controlled by a control signal (not shown). The input and output planar switch arrays are all identical, and they can be realized without waveguide crossings in integrated form. The absence of waveguide crossings simplifies and improves the design of each planar switch and N as large as 64 can be realized, using current technology, with negligible crosstalk and loss close to 5 dB.

The main difficulty with the FIG. 1 arrangement is that it requires, over the junction plane 103, precise alignment between the input 101 and output 102 switch arrays. In accordance with the present invention, in order to minimize alignment errors, I include in each path, in the vicinity of the junction plane 103, an adaptive arrangement performing variable imaging.

Figure 2:
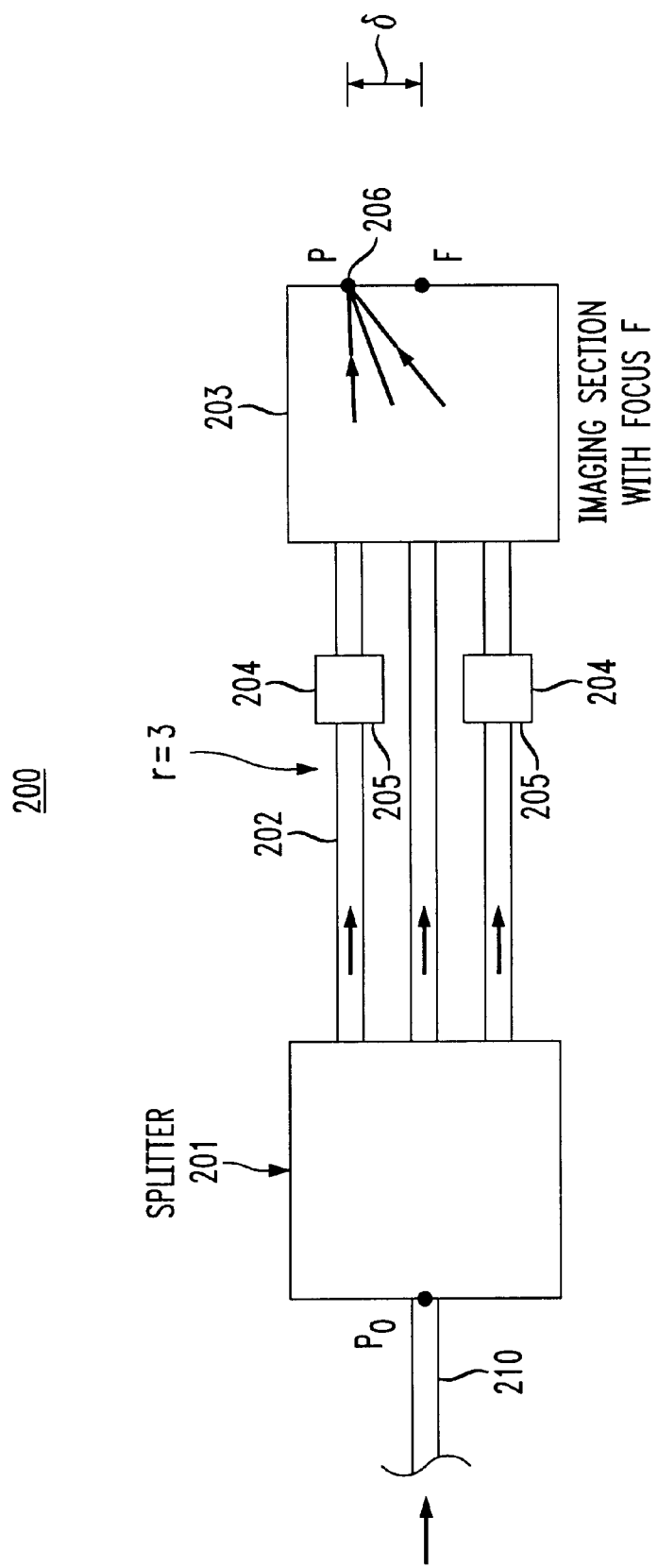
FIG. 2 shows a first embodiment of an imaging arrangement of r=3 waveguides.

With reference to FIG. 2, the imaging arrangement 200 is shown to include an optical signal splitter 201 connected by an array of waveguide paths 202 to an imaging section 203. The imaging section 203 produces at P a filtered image of the mode produced at Po by the input optical signal received over waveguide 210. Each waveguide path 202, except possibly for one particular waveguide, includes a waveguide length adjuster 204 for controlling its respective waveguide length under control of a control signal 205. Since all waveguide length adjustments are made relative to a particular reference waveguide, no waveguide length adjuster is needed in general on the reference waveguide. The reference waveguide when the number of waveguides 202 is an odd number can be for instance the center waveguide, as in FIG. 3. If the number of waveguides 202 is an even number, then only one of the waveguide above or below the center position need not have a length adjuster 204. Thus, if the number of waveguides is r, then the number of waveguide adjusters is equal to r−1.

Returning to the FIG. 2 example, by changing the length of the waveguides above and below the center waveguide in different directions, by a predetermined amount, the focus F of the output optical signal can be changed. These waveguide adjustments are made by control signals 205, with the result that the focal point location P can be changed by an amount δ in either direction from the normal focus location F. A control unit, not shown, stores the values of the control signals 205 needed to provide the correct adjustment to the waveguide adjusters 204 to be able to properly position the focus location F for all of the desired operating states of imaging arrangement 200.

The imaging arrangement 200 is characterized by two principal operating states, respectively producing maximum and minimum transmission. Maximum optical transmission (first state) is obtained by aligning the focal point P to the receiving path 206, as in FIG. 2, and minimum transmission (second state) is obtained by producing a large displacement of the focal point P from the receiving path 206. Thus the first state is used by the arrangement to minimize alignment errors when the arrangement is traversed by an active path and, the second state, is used to block transmission when the arrangement is idle, and therefore it only receives crosstalk.

As noted, wavelength adjusters 204 can vary the optical path length difference of the waveguides 202 forming the array. These wavelength adjusters 204 operate in a well-known manner, for instance by using the optoelectric effect, or by local temperature variation produced by a suitable heater. As a result the image location can be varied, and the width of this variation $\delta$ is approximately (r−1)W where W is the image (401 of FIG. 4) width and r is the number of waveguides.

Figure 3:
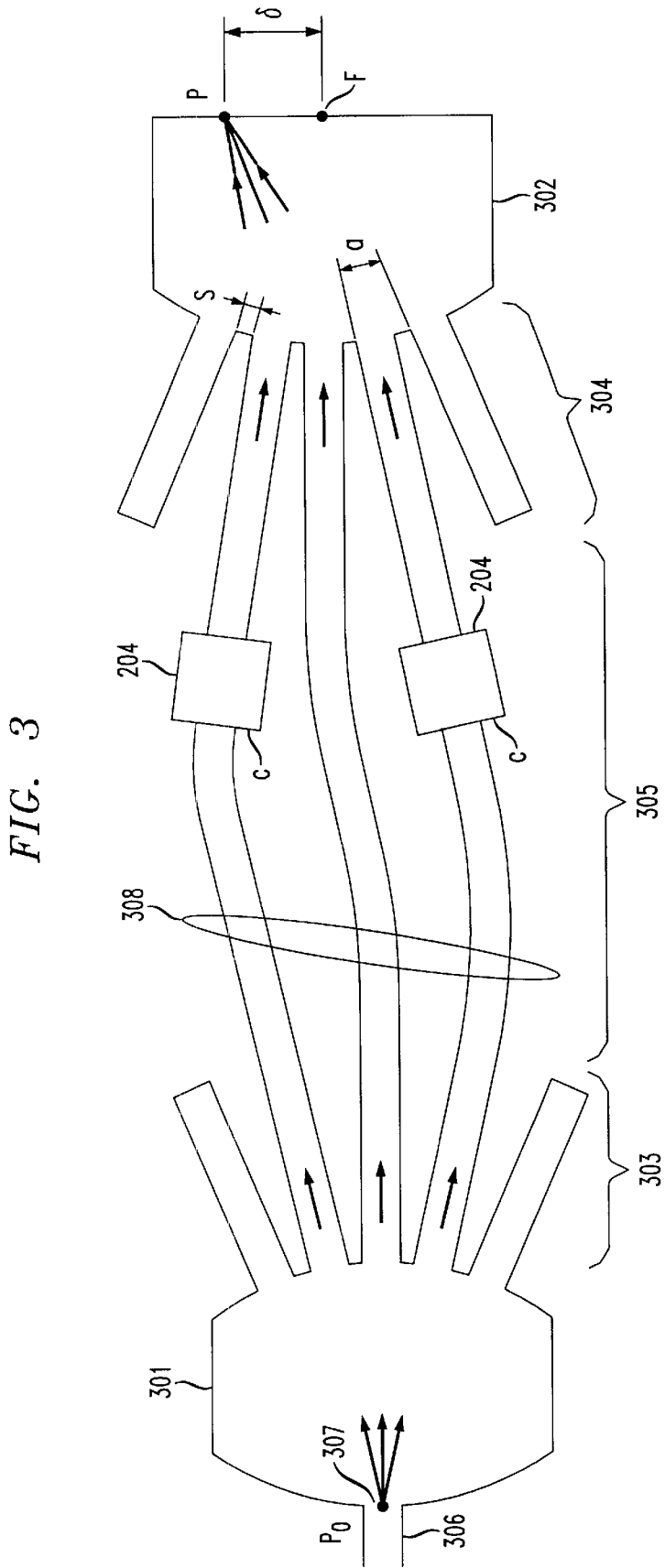
FIG. 3 shows the arrangement of FIG. 2 realized by using an efficient imaging arrangement of three waveguides combined with two radial arrays.

With reference to FIG. 3, the above imaging arrangement of FIG. 2 can be realized efficiently by using two slabs 301, 302 connected by two radial arrays 303, 304 of closely spaced waveguides (with spacing a and gap s) connected together by waveguide arms 305 [7–9]. The input waveguide 306 is then located at the focal point 307 of the first array 303 and the image is produced in the vicinity of the focal point F of the second array. The image displacement $\delta$ from the focal point is determined by the optical path length difference of the r waveguides (303, 304, 305). A similar arrangement was used in references [7,8] to construct a wavelength router, by using a waveguides grating of non-zero order producing a wavelength dependent image displacement. Here, however, the order must be zero since the displacement must be wavelength independent to a good approximation.

As in references [7,8], the purpose of the FIG. 3 imaging arrangement is to transform the mode of the input waveguide into an output replica at the image location P displaced by $\delta$ from the output focus F. In practice, the image is not an exact replica of the waveguide mode and this causes a mismatch loss, determined by the coupling coefficient between the actual image and the desired replica. The loss is minimized, as in reference [9], by optimizing the waveguide array 308, whose efficiency approaches unity if the number of waveguides r is large and they are closely spaced with small gaps, s, between their cores at the junction with the output slab 302. In our present application, however, it is important to minimize the number r−1 of controls and we therefore choose r=2,3.

Figure 4:
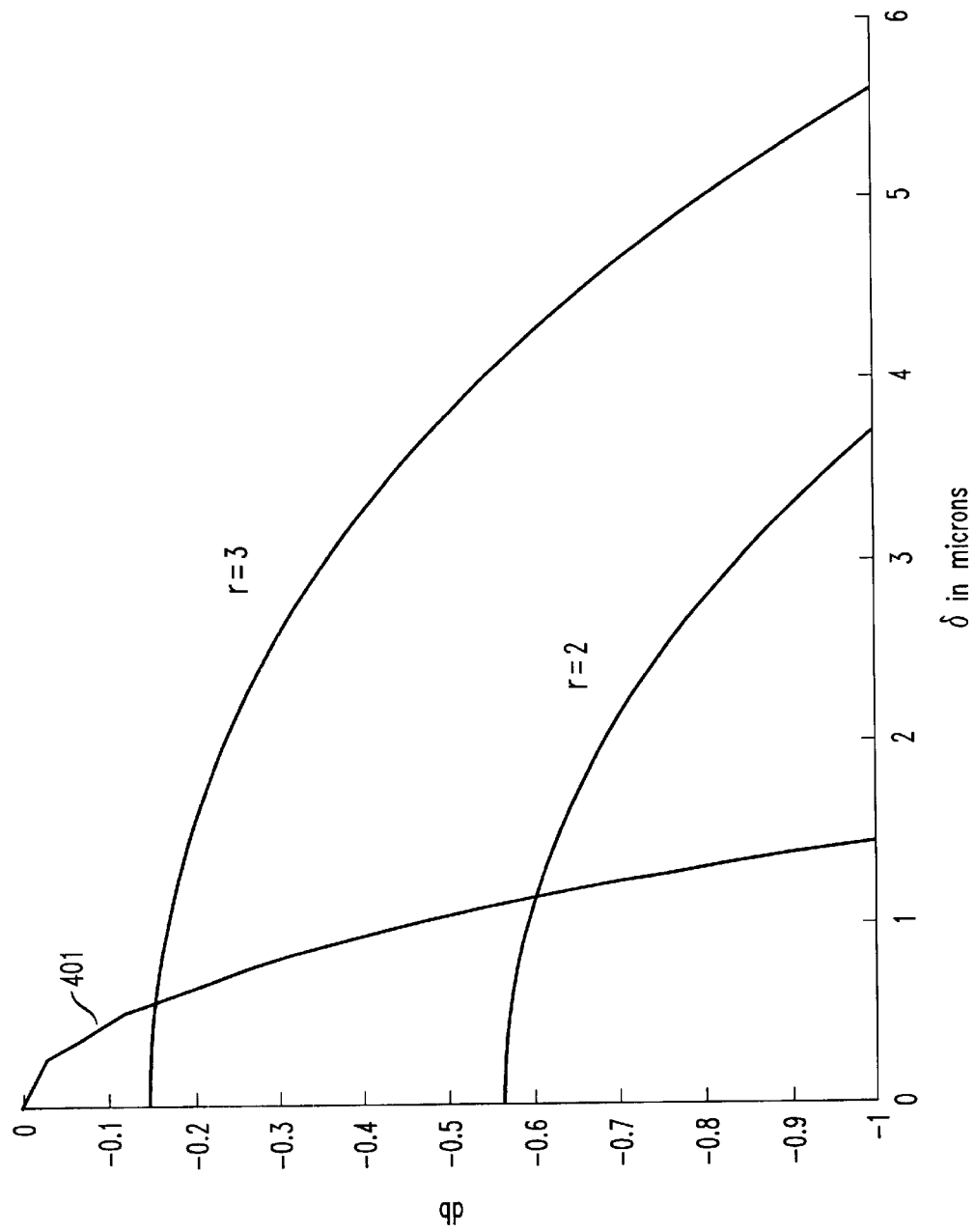
FIG. 4 illustratively shows the calculated losses versus alignment displacements for an efficient imaging arrangement of FIG. 3 with r=2, 3.

FIG. 4 shows typical calculated losses versus alignment displacements $\delta$ for an optimized imaging arrangement of FIG. 3 with r=2, 3. FIG. 4 also shows, 501, the coupling loss variation for two waveguides displaced by $\delta$, in microns. In this case, the largest $\delta$ misalignment that can be tolerated by two waveguides without exceeding a loss of one dB is $$\delta = 1.4 \text{ microns} \quad (1)$$

whereas my imaging arrangement allows a much larger deviation, $$\delta = 3.7, 5.6, \text{ for } r=2,3. \quad (2)$$

Figure 5:
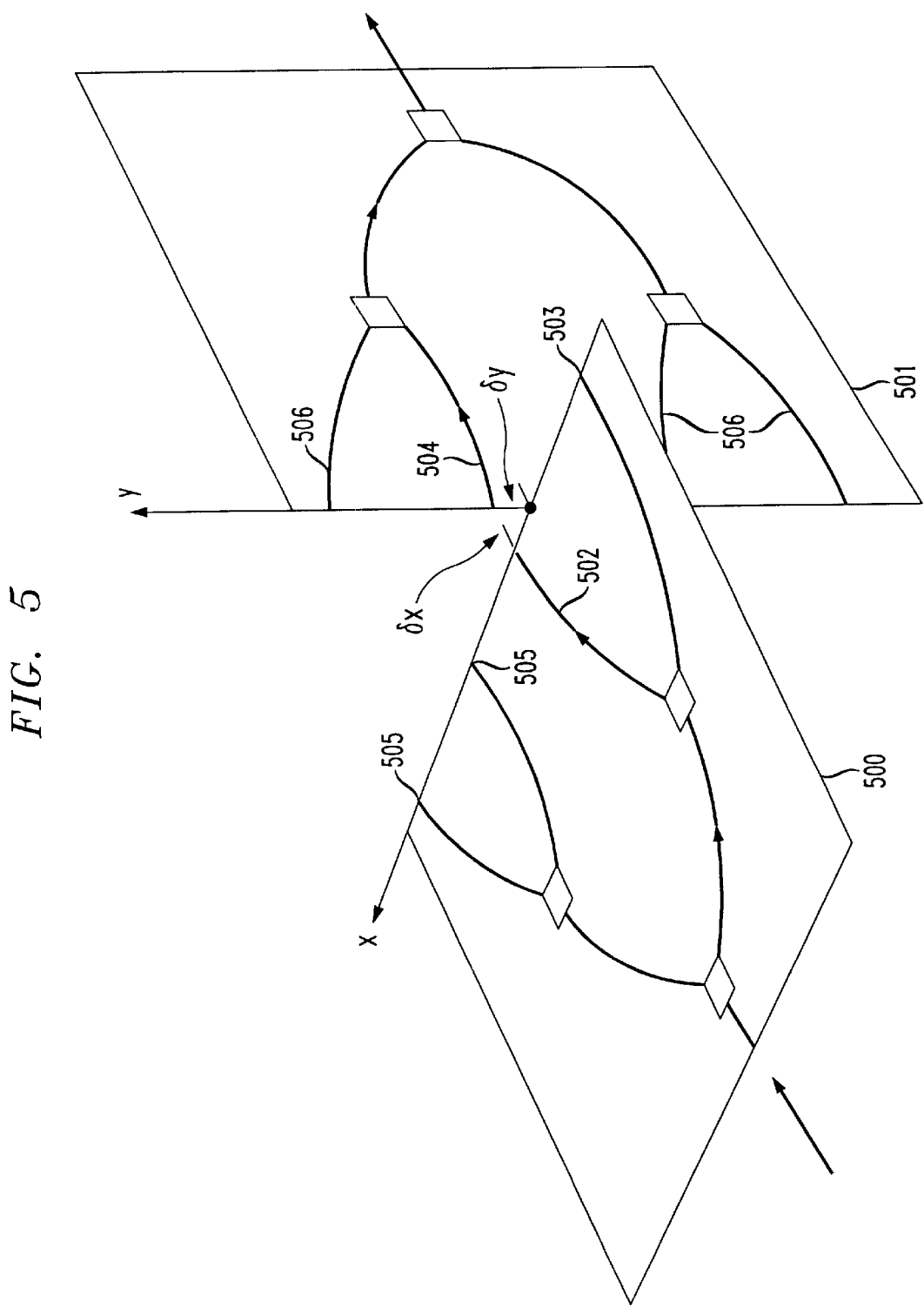
FIG. 5 shows the alignment displacements $\delta_x$, $\delta_y$, at the junction of two illustrative orthogonal planar switches of FIG. 1.

This increase in allowable deviation afforded by my imaging arrangement substantially reduces the path alignment problem $\delta_x$, $\delta_y$ shown in FIG. 5.

FIG. 5 shows the alignment displacements $\delta_x$, $\delta_y$ at the junction of two illustrative orthogonal planar switches 500 and 501 of FIG. 1. In this arrangement each path is formed by a pair of orthogonal planes which must be joined together with minimal displacements between the two waveguides 502 and 503 forming the path. The coupling losses at the junction of two waveguides 502 and 503 in FIG. 5 are caused by two orthogonal displacements $\delta_x, \delta_y$ that must be corrected by using two orthogonal imaging arrangements. The total loss in FIG. 5 is therefore twice (we need two arrangements) the loss (for one arrangement) in FIG. 4.

Figure 6:
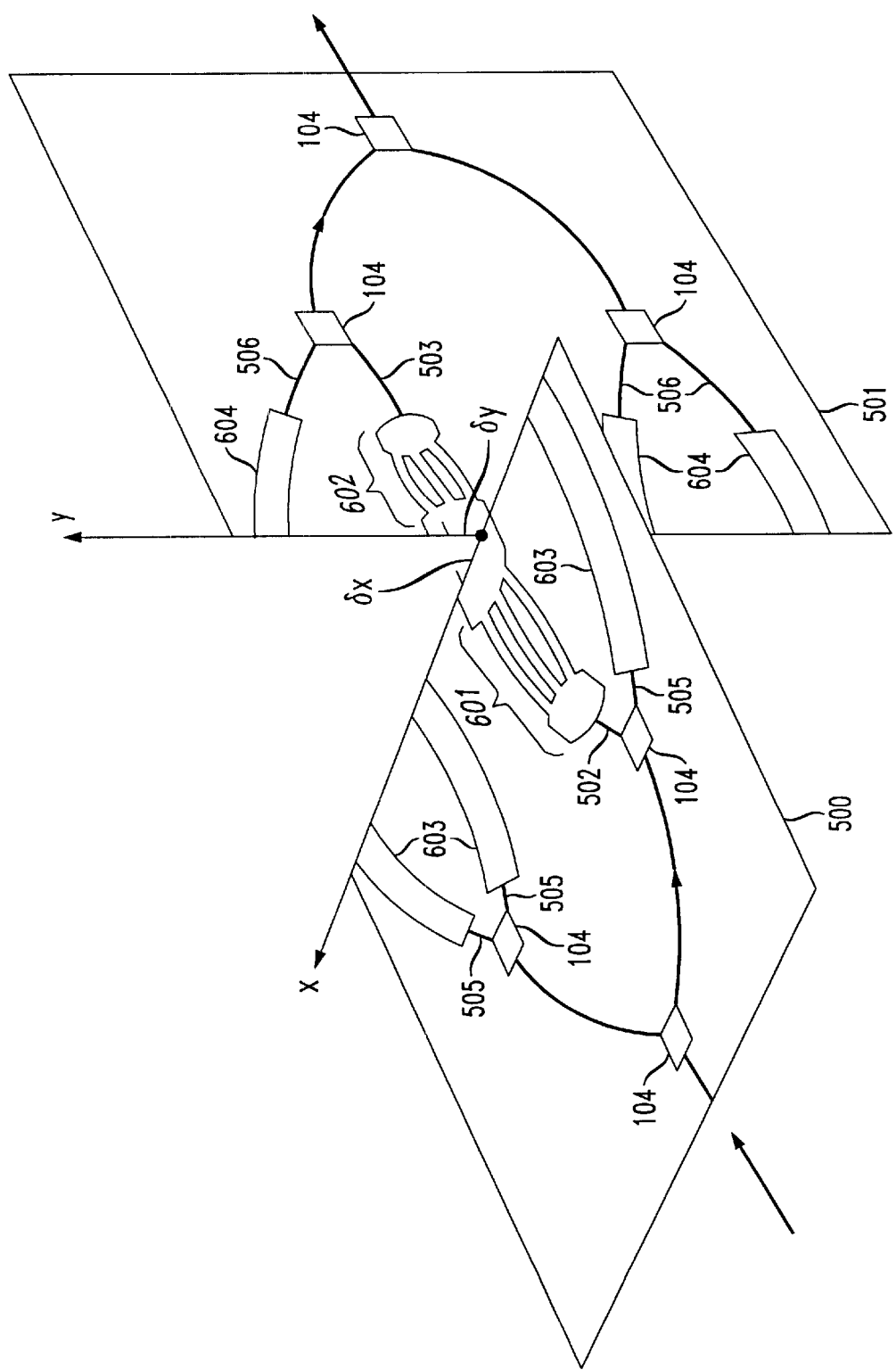
FIG. 6 shows two illustrative orthogonal planar switches of FIG. 1 utilizing the imaging arrangement of FIG. 3.

Shown in FIG. 6 are the two illustrative orthogonal planar switches 500 and 501 of FIG. 1 utilizing the imaging arrangement of FIG. 3. The imaging arrangements are shown, illustratively, by 601, 602 for the two waveguides 502 and 503, respectively, and shown in block form 603 and 604 for the other paths of planar switches 500 and 501, respectively.

Returning to FIG. 5. So far I have considered the loss through connected signal paths, 502 and 503, whose loss must be minimized. For all other paths, 505 and 506 of planar switches 500 and 501, respectively, where no signal path is to be established, substantial loss is provided by the extinction ratios of the elements 104. It is generally desirable to increase this loss, and an important feature in FIG. 5 that a substantial increase is readily obtained by properly choosing the controls of the imaging arrangements 603 and 604 so as to maximizes their loss. The only drawback is an increase in complexity of the control algorithm. The calculated increase in extinction ratio for paths 505 and 506, as provided by the imaging arrangements 603 and 604 of FIG. 6, typically exceeds 20 dB for an optimized design. Also notice that fabrication errors will cause, in general, different losses in the N active paths in FIG. 1. It may be desirable to equalize these losses, or at least reduce the difference between their maximum and minimum values, instead of minimizing the loss of each individual path. Clearly this can be realized by simply adjusting the controls of the active paths that have larger losses, so as to increase all losses that are lower than a specified acceptable loss.

Figure 7:
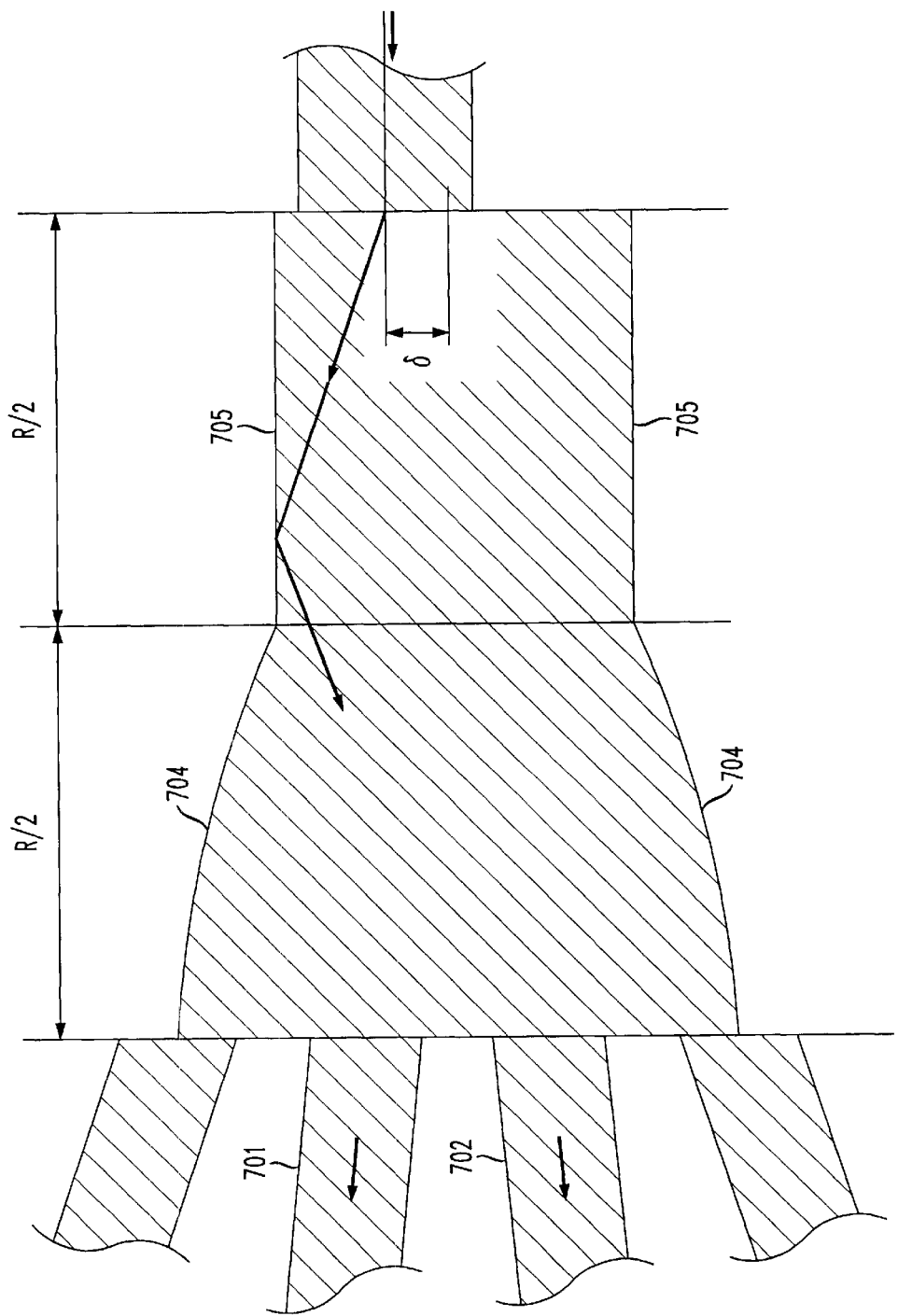
FIG. 7 shows an imaging arrangement of two slab sections with reflective boundaries.
Figure 8:
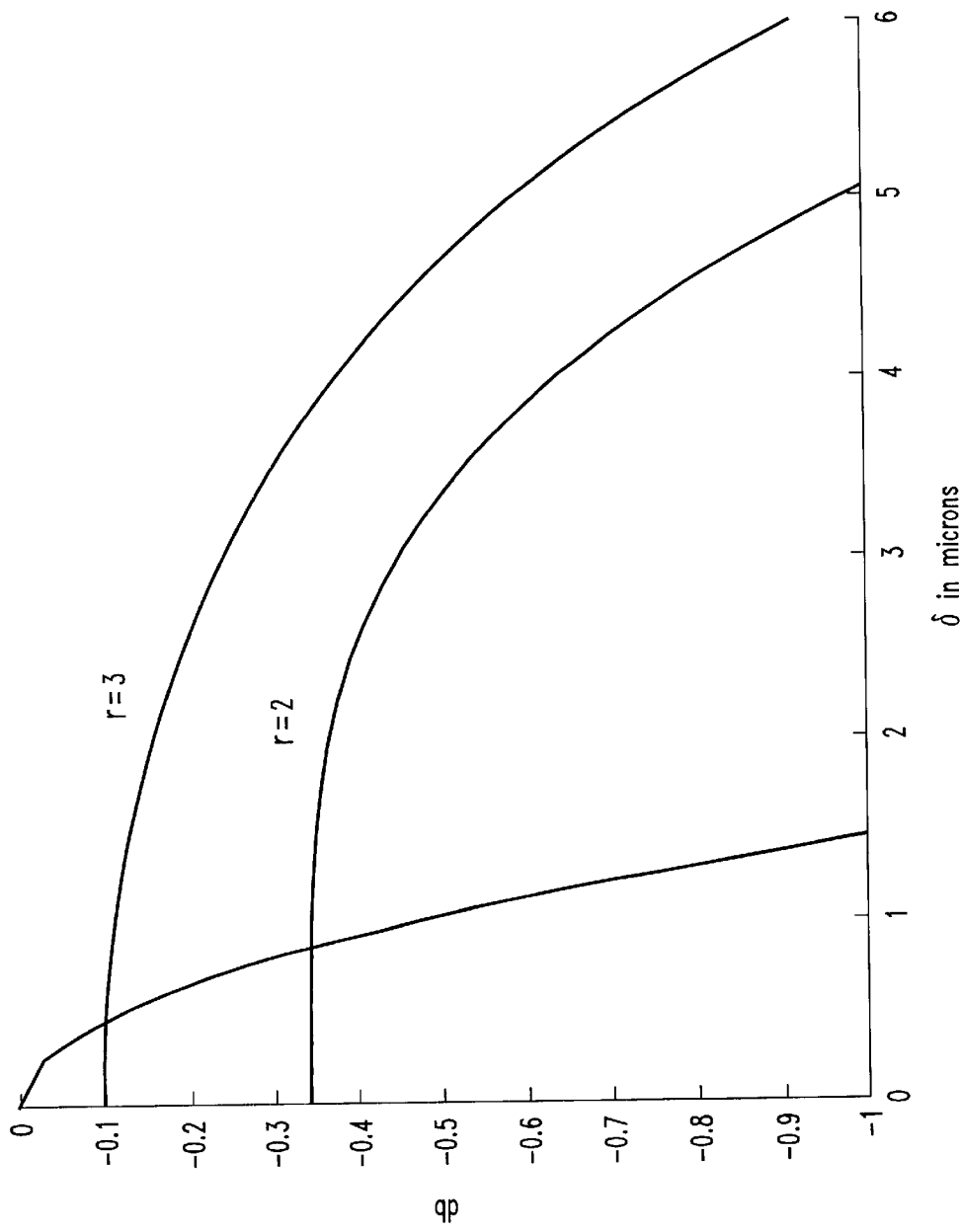
FIG. 8 shows calculated losses versus alignment displacements for the arrangement of FIG. 7.

With reference to FIG. 3, imaging section 302 primarily causes the above losses. These losses can be reduced as follows. Consider for simplicity r=2. The loss of the imaging section 302 is best derived by reversing transmission and determining the power transmitted to the r arms from a waveguide displaced by $\delta$ from the focus. The loss for r=2 consists of two components. One component arises because only some of the power is transferred to the two arms 701, 702 and, the other, because the power is not evenly transmitted to the two arms. Introducing reflective boundaries 704, 705 in the imaging slab as in FIG. 7 can reduce both problems. The slab now consists of a uniform section 705 combined with a parabolic section 704. Some of the power that in the previous arrangement of FIG. 3 was lost is now redirected by the reflective boundaries 704, 705 towards the receiving waveguides 701, 702, and typical results are shown in FIG. 8. From a comparison with FIG. 4, one can see that the losses are substantially reduced. In particular, the previous loss of 1 dB for r=1, $\delta$=3.7 to about 0.5 dB.

Use of the above imaging arrangement technique in the N=N crossbar switch of FIG. 1 both eliminates waveguides crossings and simplifies the realization of each planar switch since high extinction ratios are not any more required by switch elements 104. This is because the imaging arrangement at each leaf of the 1×N binary tree 101 or N×1 binary tree 102 provides a high (typically more than 20 dB) extinction ratio. Moreover, the waveguide bends can now be realized with large curvatures since small angles of rotation are not required, because of the absence of waveguides crossings. A consequence of this is that a small effective refractive index difference $\Delta n$ is generally desirable to simplify fabrication and improve efficiency. For this reason a value of Δn/n=0.0025 was assumed in the above example. The actual refractive index difference is larger, about 0.004.

As previously noted, the imaging arrangement can be utilized in the N×N crossbar optical switching arrangement described in my previously referenced patent application. Such a combination would offers advantages over the arrangement of reference [4]. The latter arrangement requires 2N stages and a total length of about 66 cm for N=16. The present arrangement, on the other hand, requires only 2logN stages and it is characterized by lower loss and lower crosstalk. For instance, for an average loss per stage of less than 0.2 dB, the total loss will be primarily caused by the junction loss, and it should be less than 5 dB for N as large as 64. The largest N that can be realized is determined by the spacing H (shown in FIG. 1) of the rectangular array formed by the waveguides on the junction plane. By choosing a spacing of 1 mm, the total width (N−1)H for N=64 is 6.4 cm, easily fitting on a 6-inch wafer.

Notice in FIG. 3 that the required path length difference determined by δ is small, and it must be zero when the image is produced at the focal point F. In order to satisfy this condition the waveguide arrangement in FIG. 3 is composed of two section having opposite path length differences as in reference [10], and the net result is zero difference for δ=0.

The above discussions were directed so far to the problem of directly joining, without fiber interconnections, two orthogonal sets of planar wafers, forming at their junction an array of paths connecting each wafer to all other wafers (FIG. 1). Clearly as also discussed above, my techniques also apply to the problem of connecting together two waveguides, formed on different wafers (e.g., FIG. 6). Additionally, my techniques also apply to the problem of directly joining a first wafer having N optical imaging devices to an orthogonal set of N second planar wafers, forming a linear array junction connecting each of the N optical imaging devices of the first wafer to an optical imaging device on a different second wafer of the orthogonal set of N second planar wafers. This is shown in FIG. 1, where wafer 105 connects to each of the N wafers of array 102. As shown in FIG. 1, my adaptive imaging arrangement technique is used in two orthogonal sets of N planar switch wafers that form an N=N crossbar switch. It should be understood, however, that each of the two orthogonal sets of N planar wafers need not be restricted to binary switch circuits but, more generally, the planar wafers may contain other types of optical circuits which have N optical waveguides which have to be interconnected. Moreover, each planar wafer of each set of N planar wafers need not all contain the same type of optical circuit but may, instead, contain different types of optical circuits. Thus, my adaptive imaging arrangement technique is not limited to switch applications, but more generally can be used for optical interconnections between single waveguides, linear arrays of waveguides, or two-dimensional arrays of waveguides.

In all the above-described applications, my adaptive imaging arrangement technique can be used to minimize alignment errors. In general, these errors occur both in the plane of the first wafer and in the orthogonal direction. Therefore efficient correction requires in general that the two wafers be approximately orthogonal to each other, and two adaptive imaging arrangement are required, one in each in each wafer.

APPENDIX

REFERENCES

[1] Padmanabhan, K., and Netravali, A., "Dilated Networks for Photonic Switching," IEEE Transactions on Communications, Vol. COM-35, No. 12, pp. 1357–1365, Dec. 1987.

[2] Nishi, T., Yamamoto, T., and Kuroyanagi, S., "A Polarization-Controlled Free-Space Photonic Switch Based on a PI-Loss Switch," IEEE Photon. Technol. Lett., Vol. 6, No. 9, pp. 1104–1106, Sept. 1993.

[3] Kondo, M., Takado, N, Komatsu, K., and Ohta, Y., "32 Switch Elements Integrated Low Crosstalk LiNbO3 4×4 Optical Matrix Switch," IOOCECOC 85, Venice, pp. 361–364, 1985.

[4] Goh, T., Himeno, A., Okuno, M., Takahashi, H., and Hattori, K., "High Extinction Ratio and Low Loss Silica-Based 8×8 Thermooptic Matrix Switch," IEEE Photon. Technol. Lett., Vol. 10, No. 3, pp. 358–360, March 1998.

[5] Granestrand, P., Lagerstrom, B., Svensson, P., Olofsson, H., Falk, J. E., and Stoltz, B., "Pigtailed Tree-structured 8×8 LiNbO$_3$ Switch Matrix with 112 Digital Optical Switches," IEEE Photon. Technol. Lett., Vol. 6, pp. 71–73, 1994.

[6] Murphy, E. J., Murphy, T. O., Ambrose, A. F., Irvin, R. W., Lee, B. H., Peng, P., Richards, G. W., and Yorinks, A., "16×16 Strictly Nonblocking Guided-wave Optical Switching System," J/Lightwave Technol., Vol. 10, pp. 810–812, 1998.

[7] Dragone, C., "An Optical Multiplexer Using a Planar Arrangement of Two Star Couplers" IEEE Photon. Technol. Lett. 3, pp. 812–815, 1991.

[8] Dragone, C., Edwards, C., and Kistler, R. C., "Integrated Optics N×N Multiplexer on Silicon," IEEE Photon. Technol. Lett. 3, pp. 896–899, 1991.

[9] Dragone, C., "An N×N Optical Multiplexer Using a Planar Arrangement of Two Star Couplers," IEEE Photon. Technol. Lett., 3, pp. 812–815, 1991.

[10] Adar, R., Dragone, C., and Henry, C. H., "Planar Lens and Low Order Array Multiplexer," U.S. Patent No. 5,212,758.

What is claimed is:

1. Apparatus for interconnection of two or more optical waveguides comprising a first planar wafer having a first optical imaging device for selectively focusing a signal on a first optical waveguide to a first focal point located along a predefined first focal interval of an edge of the first wafer;

a second waveguide located on a second planar wafer that has an abutting edge forming an intersection junction with the edge of the first wafer, the second wafer includes an optical imaging device for selectively coupling a signal on a second optical waveguide to a focal point located along a predefined focal interval of the abutting edge of the second wafer, the focal intervals of the first and second wafers intersect each other; and wherein the first and second optical imaging devices each operate in response to a control signal to align their respective focal points with the intersection junction and thereby maximize signal coupling from the first optical waveguide to the second optical waveguide.

2. The optical waveguide interconnection apparatus of claim 1 wherein under appropriate control signals, the first optical imaging device and the second optical imaging device together operate as a switch device whose signal coupling can be substantially reduced between the first optical waveguide to the second optical waveguide.

3. The optical waveguide interconnection apparatus of claim 1 wherein at least one optical imaging device includes a signal splitter, an imaging device, and an array of waveguides connecting the splitter to the imaging device, where all but possibly one of the waveguides each include a waveguide length adjuster, wherein in response to a control signal each waveguide length adjuster changes its length to change the focal point of the first optical imaging device.

4. The optical waveguide interconnection apparatus of claim 3 wherein at least one optical imaging device includes two waveguides.

5. The optical waveguide interconnection apparatus of claim 3 wherein at least one optical imaging device includes three waveguides.

6. The optical waveguide interconnection apparatus of claim 1 further comprising a plurality of first planar wafers abutting the second wafer so that each abutting edge of each of the first wafers abuts an edge of the second wafer, thus forming a plurality of junction points;

wherein each of the first wafers includes a first optical imaging device for selectively coupling a signal from an optical waveguide to a focal point located along a first predefined interval of the abutting edge of the first wafer, the interval being positioned so as to include one of said junction points formed with the second wafer;

said second wafer including a plurality of second optical imaging devices, each second imaging device selectively coupling an optical waveguide on the second wafer to a signal focal point located along a predefined interval, the interval being positioned on the abutting edge of the second wafer to include a junction point with one of said first wafers, so that each first optical imaging device forms a pair with a particular second optical imaging device of the second wafer; and wherein said pair of optical imaging devices with intersecting focal intervals is each responsive to a control signal to align their respective focal points to increase the coupling of an optical signal from a first optical imaging device to a second optical imaging device of said pair.

7. The optical waveguides interconnection apparatus of claim 6 wherein each pair of optical imaging devices that overlap the same intersection junction together operate as a switch device whose signal transmission can be either maximized, by aligning the respective focal points of said each pair of optical imaging devices, or minimized, by misaligning the respective focal points of said each pair of optical imaging devices, to reduce crosstalk when the switch device is not traversed by the signal.

8. The optical waveguide interconnection apparatus of claim 6 wherein at least one optical imaging device includes a signal splitter, an imaging device, and an array of waveguides connecting the splitter to the imaging device, where all but possibly one of the waveguides each include a waveguide length adjuster, wherein in response to a control signal each waveguide length adjuster changes its length to change the focal point of said optical imaging device.

9. The optical waveguide interconnection apparatus of claim 8 wherein at least one optical imaging device includes two waveguides.

10. The optical waveguide interconnection apparatus of claim 8 wherein at least one optical imaging device includes three waveguides.

11. The optical waveguide interconnection apparatus of claim 1 further comprising a plurality of first planar wafers abutting a plurality of second wafers so that each abutting edge of each of the first wafers abuts all edges of the second wafers, thus forming a plurality of junction points;

wherein each of the first wafers includes an optical imaging device for selectively coupling a signal from an optical waveguide to a focal point located along a first predefined interval of the abutting edge of the first wafer, the interval being positioned so as to include a junction point with a second wafer;

each of said second wafers has at least one optical imaging device for selectively coupling a signal from a focal point located along a predefined interval, the interval being positioned on the abutting edge of the second wafer to include a junction point with a first wafer, so that each optical imaging device on a first wafer is connected at a junction point with a corresponding optical imaging device on a second wafer; and wherein said pair of connected optical imaging devices with intersecting focal intervals is each responsive to a control signal to align their respective focal points to enable the coupling of an optical signal from the first optical imaging device to the second optical imaging device of said pair.

12. The optical waveguides interconnection apparatus of claim 11 wherein each pair of optical imaging devices that overlap the same intersection junction together operate as a switch device whose signal transmission can be either maximized, by aligning the respective focal points of said each pair of optical imaging devices, or minimized, by misaligning the respective focal points of said each pair of optical imaging devices, to reduce crosstalk when the switch device is not traversed by the signal.

13. The optical waveguide interconnection apparatus of claim 11 wherein at least one optical imaging device includes a signal splitter, an imaging device, and an array of waveguides connecting the splitter to the imaging device, where all but possibly one of the waveguides each include a waveguide length adjuster, wherein in response to a control signal each waveguide length adjuster changes its length to change the focal point of the first optical imaging device.

14. The optical waveguide interconnection apparatus of claim 13 wherein at least one optical imaging device includes two waveguides.

15. The optical waveguide interconnection apparatus of claim 13 wherein at least one optical imaging device includes three waveguides.

16. The optical waveguide interconnection apparatus of claim 1 arranged as an N×N optical cross-connect apparatus comprising a first plurality of first planar wafers, each first wafer including an input optical waveguide connected to a 1×N switch, each of the N output waveguides of the switch having an optical imaging device for selectively coupling a signal to a focal point located along a predefined interval of the abutting edge of the first wafer, thus forming a first array of disjoint intervals, each corresponding to a particular output waveguide of a particular first wafer;

a second plurality of second planar wafers, each second wafer including an N×1 switch connected to an output optical waveguide, each of the N input waveguides of the switch having an optical imaging device for selectively coupling the optical waveguide to an input focal point located along a predefined interval of the abutting edge of said second wafer; thus forming a second array of disjoint intervals, each corresponding to a particular input waveguide of a particular second wafer;

wherein the plurality of first and second wafers are essentially abutted orthogonal to each other to form a grid of intersection junctions therebetween and wherein each interval of the first array intersect a corresponding interval of the second array; and wherein each pair of optical imaging devices producing a pair of intersecting intervals are responsive to a control signal to align their respective focal points to enable the coupling of an optical signal from a first optical imaging device to a second optical device of said pair.

17. The N×N optical cross-connect apparatus of claim 16 wherein each pair of imaging devices with intersecting focal intervals together operate as a switch device whose signal transmission can be either maximized, by aligning the respective focal points of said each pair of optical imaging devices, or minimized, by misaligning the respective focal points of said each pair of optical imaging devices, to reduce crosstalk when the switch device is not traversed by the signal.

18. The N×N optical cross-connect apparatus of claim 16 wherein at least one optical imaging device includes a signal splitter, an imaging device, and an array of waveguides connecting the splitter to the imaging device, where all but possibly one of the waveguides each include a waveguide length adjuster, wherein in response to a control signal each waveguide length adjuster changes its length to change the focal point of the first optical imaging device.

19. The N×N optical cross-connect apparatus of claim 18 wherein at least one optical imaging device includes two waveguides.

20. The N×N optical cross-connect apparatus of claim 18 wherein at least one optical imaging device includes three waveguides.

21. A method of operating an apparatus for the interconnection of optical waveguides comprising the steps of abutting a first edge of a first planar wafer to a second edge of a second planar wafer, the first wafer having a first optical imaging device for selectively coupling a signal to a first focal point located along a first predefined interval of the first abutting edge of the first wafer and the second planar wafer having a second optical imaging device for selectively coupling a signal to a second focal point located along a second predefined interval of the second abutting edge of the second wafer so as to overlap said first predefined interval of the first abutting edge of the first wafer; and selectively operating at least one of the first and second optical imaging devices to enable the first focal point to align with the second focal point to enable the coupling of an optical signal between the first optical imaging device and the second optical imaging device.

* * * * *